(12) United States Patent
Page et al.

(10) Patent No.: US 9,346,024 B2
(45) Date of Patent: May 24, 2016

(54) PRODUCING OR DISPENSING LIQUID PRODUCTS

(71) Applicant: Headmaster Ltd, Hampshire (GB)

(72) Inventors: John Kenneth Rurik Page, Berkshire (GB); Mark George Page, Berkshire (GB)

(73) Assignee: HEADMASTER LTD., Bramshill, Hampshire (GB)

( * ) Notice: Subject to any disclaimer, the term of this patent is extended or adjusted under 35 U.S.C. 154(b) by 242 days.

(21) Appl. No.: 14/239,430

(22) PCT Filed: Oct. 22, 2012

(86) PCT No.: PCT/GB2012/000804
§ 371 (c)(1),
(2) Date: Feb. 18, 2014

(87) PCT Pub. No.: WO2013/061015
PCT Pub. Date: May 2, 2013

(65) Prior Publication Data
US 2014/0220207 A1    Aug. 7, 2014

(30) Foreign Application Priority Data

Oct. 25, 2011 (GB) .................................. 1118358.9
Apr. 24, 2012 (GB) .................................. 1207147.8
Jul. 24, 2012 (GB) .................................. 1213176.9

(51) Int. Cl.
| | | |
|---|---|---|
| *B01F 3/04* | (2006.01) | |
| *B01F 15/00* | (2006.01) | |
| *B67D 1/00* | (2006.01) | |
| *A23L 2/54* | (2006.01) | |

(52) U.S. Cl.
CPC .............. *B01F 3/04269* (2013.01); *A23L 2/54* (2013.01); *B01F 3/04099* (2013.01); *B01F 3/04808* (2013.01); *B01F 3/04815* (2013.01); *B01F 15/00253* (2013.01); *B01F 15/00357* (2013.01); *B67D 1/0057* (2013.01); *B67D 1/0072* (2013.01); *B01F 2003/04404* (2013.01); *B01F 2003/04822* (2013.01)

(58) Field of Classification Search
CPC ... A23L 2/54; B01F 3/04099; B01F 3/04269; B01F 3/04808; B01F 3/04815; B01F 15/00253; B01F 15/00357; B01F 2003/04404; B01F 2003/04822; B67D 1/0057; B67D 1/0072
USPC .................................. 261/38, 66, 104, DIG. 7
See application file for complete search history.

(56) References Cited

U.S. PATENT DOCUMENTS

| | | |
|---|---|---|
| 4,927,567 A | 5/1990 | Rudick |
| 4,950,431 A | 8/1990 | Rudick et al. |

(Continued)

OTHER PUBLICATIONS

International Search Report for PCT/GB2012/000804 (Jan. 25, 2013).

*Primary Examiner* — Charles Bushey
*Assistant Examiner* — Scott Bushey
(74) *Attorney, Agent, or Firm* — McClure, Qualey & Rodack, LLP

(57) ABSTRACT

A liquid product is dispensed via a membrane contactor. The contactor employs a plurality of gas-permeable hollow fibers. The contactor has a gas port communicating with the interior of the fibers and input and output ports for liquid communicating with space within the contactor surrounding the fibers. A gas comprising carbon dioxide or nitrous oxide is dissolved in the liquid in the contactor. The gas at a controlled pressure is supplied to the gas port. The liquid is supplied at a higher pressure than the gas to the input port for liquid from a supply of such liquid via a first valve having a first valve inlet port communicating with the supply of liquid and a first valve outlet port communicating with the inlet port for liquid. Liquid with the gas dissolved therein is dispensed from the outlet port for liquid via a dispense tap to ambient. The dispensing liquid step includes a start dispense step in which dispensing commences and a stop dispense step in which dispensing is stopped. The first valve is opened with the dispensing tap in the start dispense step, and is closed in the stop dispense step. Pressure build-up is relieved in liquid in communication with the space within the contactor surrounding the fibers after closure of the first valve and while maintaining the first valve closed. The balance between gas pressure and liquid pressure during the systems' standby periods protects the membranes from flooding.

15 Claims, 10 Drawing Sheets

(56) References Cited

U.S. PATENT DOCUMENTS

| | | | | |
|---|---|---|---|---|
| 5,565,149 A | * | 10/1996 | Page | B01D 19/0031 210/321.8 |
| 6,138,995 A | * | 10/2000 | Page | B67D 1/0077 210/321.8 |
| 7,104,531 B2 | * | 9/2006 | Page | A23L 2/54 261/104 |
| 2005/0279684 A1 | * | 12/2005 | Hsu | B01F 3/04049 210/192 |

\* cited by examiner

PRODUCING OR DISPENSING LIQUID PRODUCTS

FIELD OF DISCLOSURE

This disclosure relates to the production or dispensing of liquid products. The term "liquid" is used in this disclosure to encompass both true liquids and semi-liquids such as creams, emulsions, and foams that retain at least some ability to flow.

BACKGROUND

Some liquids such as draught beverages require certain levels of gases, particularly carbon dioxide, alone or together with other gases, to be dissolved in at least one of the constituent liquids in order to achieve a desired property such as the desired taste and presentation effects in the dispensed drink. Other liquids such as certain dairy products similarly require levels of nitrous oxide, alone or together with other gases to be dissolved in at least one of the constituent liquids in order to achieve a desired foamed constituency upon dispense The use of gas/liquid contactor modules containing gas-permeable hollow fibres for controlling dissolved gases in liquids is well known. Examples of such contactors and associated schemes for control of their operation have been described in U.S. Pat. No. 5,565,149 and U.S. Pat. No. 7,104,531, the disclosures of both of which are incorporated herein by reference. The advantage of such contactors is their capability of achieving bubble-less and efficient transfer of gases into solution in liquids without causing turbulence or mechanical agitation of the liquid.

These contactor modules are typically constructed with a gas port which is connected to a pressurised gas source and two ports connected respectively to a liquid source and to a dispense tap.

For contactor modules utilising the types of fibres described in U.S. Pat. No. 5,565,149 and U.S. Pat. No. 7,104,531, the gas port communicates with the cores or bore side of the hollow fibres, and the liquid ports communicate with the outer surfaces or shell side of fibres. This format provides a large surface area for contact between gas and liquid to give efficient gas transfer into the liquid together with low frictional loss when liquid flows through the contactor. The gas transfer efficiency, defined as the ratio of gas actually dissolved in the output liquid to the saturation level of gas for the applied gas pressure and the process temperature, depends on the detailed design of the contactor. This efficiency generally increases with increasing residence time of the liquid within the contactor.

The preferred type of fibre used in such contactors may be classified as permeable, asymmetric skinned, and hydrophobic. Such fibres are preferred for the addition of gases to beverages because they have a relatively high resistance to flooding and their surfaces which are in contact with the liquids are smooth and so contain very few sites which could encourage biological growths to form. However, in practice, there may be a small number of physical defects in some fibre walls which defects may allow passage of liquid from the shell side into the bore side when hydraulic pressure exceeds gas pressure. The rate of liquid penetration through such defects increases in proportion to the pressure differential between liquid and gas.

Beverage dispense applications involve long periods when liquid is static within the shell side of the contactor before being caused to flow out to the dispense tap. Practical dispense systems using hollow fibre contactors therefore include pressure control devices in the feed gas and liquid streams to avoid flooding of the fibre bores and also to ensure that the liquid retains the gases in solution within both the contactor and the tube leading from its outlet port to the dispense tap. U.S. Pat. No. 5,565,149 and U.S. Pat. No. 7,104,531 disclose examples of such controls.

In practical tests with these contactors, liquid can be detected in the bore side of modules after maintaining an excess liquid pressure of about 0.1 MPa (1 bar) to the shell side for longer than 1 hour. Ultimately, exposure to such condition will cause the bore side volume of some fibres to flood and lead to reduced efficiency of gas transfer.

Standard pressure control devices can be used to achieve an approximate balance between liquid and gas pressures for contactors when the liquid is supplied from a gas-driven pump. It is also possible to achieve approximate pressure balance when electrically-driven pumps are used.

It is a natural characteristic of electrically-driven and gas-driven beverage pumps that their liquid delivery pressures increase when output liquid flow rates are reduced, and are at a maximum when the outlet flow is stopped.

In beverage dispense applications this characteristic is exploited to cause such pumps to stop and start automatically in response to their downstream liquid pressures. Most electrically-driven pumps for use with beverages incorporate a pressure switch communicating with their outlet for liquid delivery, while gas-driven pumps rely on flexible diaphragms and non-return valves. Working differentials between the starting pressure and the stopping pressure of these pumps are due to the mechanical hysteresis in their corresponding components, so that, when the dispense tap is open, the liquid's pressure at the outlet of the pump is lower than when the dispense tap is closed.

With conventional control schemes in beverage dispense systems using membrane contactors, the pressures of gas and liquid within the contactor can therefore be balanced with reasonable accuracy either for the condition when liquid is flowing or for the condition when it is not flowing.

In draught dispense practice, since liquid is only caused to flow intermittently through the contactor, controls will conventionally be chosen to protect the contactor by arranging for the pressures of gas and liquid to be balanced during the much longer periods when there is no requirement for liquid to flow. Consequently, the applied gas pressure will normally be greater than the applied liquid pressure during dispense flow.

For a well-designed membrane contactor, this method of control exposes the carbonated liquid to super-saturated conditions during dispense, risking the formation of gas bubbles in the contactor and in the tubing between its outlet and the dispense tap. Super-saturation increases the difficulties of dispensing highly-carbonated beverages, especially those which have a tendency to form foam on dispense. Examples of such drinks include beers, lagers, wines and some brands of whisky-water mixes.

U.S. Pat. No. 5,565,149, in the FIGS. 10 and 11 and in the description in that document, disclosed for the first time the observation of surprisingly high carbonation levels when carbonating beverages in certain types of dispense systems utilising membrane contactors. In U.S. Pat. No. 5,565,149 it was postulated that intermittent operation of the dispense tap caused transients in the pressure and flow in the liquid side of the contactor which resulted in significant changes in liquid boundary layers surrounding each fibre, and hence allowed an increased carbonation compared to that found under operation at continuous liquid flow.

In parallel with that surprisingly increased carbonation, the pressure of liquid within the contactor increased after the dispense tap closed, and in U.S. Pat. No. 5,565,149 it was assumed that this pressure increase was the result of the increased carbonation.

In our tests of beverage dispense systems using membrane contactors to carbonate liquids we have now discovered that the explanation for that surprising observation given in U.S. Pat. No. 5,565,149 was incomplete.

We have found that this increase in liquid pressure will occur in all beverage dispense systems using membrane contactors to dissolve gases in liquids where, at the end of each dispense event, the liquid-containing part of the contactor communicates with a closed liquid volume.

This effect has an important and additional significance in the control of such systems utilising such contactors.

It is our present belief that, heretofore, no control systems have been commercially available that are capable both of protecting the membranes of dispense systems utilising membrane contactors of the general type generally described in U.S. Pat. No. 5,565,149 from flooding during standby periods and of avoiding super-saturation during dispense events. Any such control systems would need to have parts that contact the liquid being dispensed that can be sanitised in situ using normal cleaning procedures.

Using a conventional control scheme, at the instant when the dispense tap is closed the pressure of liquid within the contactor increases as expected to the normal stalled pressure which is characteristic of the particular beverage pump being used. However, we have found that this liquid pressure does not then remain constant, but starts to increase further over a short period of time. The final pressure achieved is significantly greater than the pump's stalled pressure, and it then remains constant until the next dispense event.

Our measurements show that the magnitude of this effect is very similar for carbonation of beer, wine or de-aerated water at a temperature of 3 degrees Celsius, using membrane contactors with liquid capacity 200 ml.

We have carried out detailed measurements using deaerated water as the liquid being carbonated, the results being set out below.

Liquid volumes each of 250 ml were dispensed using a flow rate of 11 ml per second at equal intervals of 2.5 minutes. From previous measurements it was determined that the efficiency of the contactor being employed was approximately 93% for a continuous flow at 11 milliliters per second. The residence time of 2.5 minutes between dispense events is known to be sufficiently long for the contactor's liquid contents to reach full saturation.

Liquid was supplied to the contactor by a gas-driven pump connected to a gas pressure of 0.25 MPa, which resulted in a flow pressure of 0.22 MPa and a stalled pressure of 0.25 MPa. In these measurements the pressure of carbon dioxide applied to the contactor was maintained constant at 0.22 MPa.

Each time that dispense flow stopped, the observed liquid pressure in the contactor immediately increased from 0.22 MPa to the stall pressure of 0.25 MPa, and then it began to increase further over a period of 25 seconds and reached a final value between 0.33 and 0.35 MPa. This pressure then remained constant until the next dispense event.

This effect, causing a significant increase in liquid pressure above the beverage pump's stalled pressure, means that previously proposed draught carbonating dispense systems utilising membrane contactors have been unable to achieve the necessary controlled balance between liquid pressure and gas pressure, with the consequence that the efficiency of the membrane contactor decreases over time.

In further tests carried out on the system using the same process conditions, after each closure of the dispense tap, additional amounts of liquid were carefully withdrawn downstream of the contactor. These amounts were small enough to prevent the gas-driven liquid pump from re-starting. The liquid pressure in the contactor was initially reduced by this action, and then increased at the same rate and over the same period as previously observed, but to final values which were lower than observed in the earlier tests.

We have found that the final liquid pressure was determined by the volume of extra liquid drawn off, provided that such volume was less than 0.9 ml. When the additional volume of 0.9 ml or greater was withdrawn the final liquid pressure achieved was equal to the applied gas pressure.

In yet further tests, the single contactor was replaced by two contactors of the same type which were connected in series. Process temperature and pressure conditions were unaltered, but the dispense volumes and flow rate were increased to 500 ml and 22 ml per second respectively. We found that a final pressure balance could be achieved if the amount of liquid withdrawn after dispense was increased to 1.8 ml.

Carbonation of water is known to be an exothermic process, and at this level it causes approximately 2 degrees Celsius increase in liquid temperature. However, this would result in a thermal expansion of only 0.08 ml of liquid within the single contactor used in our tests. We therefore conclude that the observed effect of pressure increase was not caused by thermal expansion of the liquid.

At the instant when the dispense tap closes and liquid flow stops, a gradient in the local carbonation naturally exists within the contactor, with virtually no carbonation present at the inlet end and a high carbonation, here at 93% of saturation, at the outlet end.

The ultimate carbonation level of the liquid within the contactor, attained a short period following closure of the dispense valve, is determined by both the applied pressure of gas and the temperature of the liquid.

We concluded that net expansion of the liquid was caused by the process of additional carbonation taking place within the contactor, commencing at the instant when dispense flow stops and continuing until all of its contained liquid reaches saturation carbonation. The hydraulic pressure of the trapped liquid increases as it expands against containment by membrane fibres and flexible tubing in the circuit.

We are supported in these views by experimental work published in a quite different field bearing no relation to carbonating beverages during dispense utilising membrane contactors, namely ocean research. Yongchen Song et al have shown that the ratio of density of carbonated water to that of plain water, and the difference between those densities, increase linearly with the level of carbonation, and that these effects are independent of pressure and temperature. (*Measurement of the density of CO2 solution by Mach-Zehnder Interferometry; Yongchen Song et. al.; Annals of the New York Academy of Sciences* 972 (2002); 206-212).

The magnitudes of the volume increases which we found in our own tests described above are in full agreement with calculations from the published data of Yongchen Song et al.

We have found that, in carbonation dispense using membrane contactors, the amount of this liquid expansion is proportional to the liquid-containing volume of the contactor and also to the ultimate saturation level of carbonation.

For carbonation, the magnitude of the expansion is simply expressed to sufficient accuracy by formula (1) below:

$$\Delta v = K \cdot V_c \cdot C \cdot (1 - 0.5\eta) \quad (1)$$

where
K=a constant, approximately $7.2 \times 10^{-4}$
Δv=characteristic liquid expansion amount for the contactor, in milliliters
$V_c$=liquid volume of contactor, in milliliters
C=saturation level of carbonation, in grams per liter
η=efficiency of contactor at continuous flow condition Many carbonation dispense applications require relatively high flow rates, say 0.045 liters per second or more, and relatively high carbonation levels, say 10 grams of dissolved carbon dioxide per liter or higher. In order to achieve such carbonating performance the contactors will have liquid volumes of the order of 0.5 liters. The amount of liquid expansion following closure of the dispense tap will therefore be greater than 2 ml. This expansion will cause a very significant increase of liquid pressure, especially for compact carbonating systems of the type that would be employed in dispensing beverages from a bag-in-box container such as a polypin container employed for beer, with consequent damage to the membrane contactor.

Similar relationships will apply for other gases than carbon dioxide, but with different specific values for the constant K.

A significant expansion effect will result when using other gases, such as nitrous oxide, which, like carbon dioxide, have high solubilities in the liquids which form constituents of beverages.

Thus, problems similar to those discussed above will arise in dispense systems for other liquids or semi-liquids that add a highly soluble gas to the liquid at the point of dispense, where a membrane contactor is employed, as for example in the dispensing of foamed milk or cream, where the gas added at dispense is nitrous oxide. Where the added gas is nitrogen, oxygen or mixtures thereof such as compressed air, the problem is not significant, since the solubility of these gases in an aqueous liquid is very much less than the solubility of carbon dioxide or of nitrous oxide.

The present disclosure seeks to overcome the problems inherent in previous systems involving addition of carbon dioxide or nitrous oxide to liquids during dispense utilising a membrane contactor.

SUMMARY OF THE DISCLOSURE

According to a first aspect of the present disclosure, there is provided a method for producing or dispensing liquid products in which a membrane contactor employing a plurality of gas-permeable hollow fibres, the contactor having a gas port communicating with the interior of the fibres and input and output ports for liquid communicating with space within the contactor surrounding the fibres, is employed to dissolve a gas comprising carbon dioxide or nitrous oxide in a liquid, the method comprising the steps of:

supplying the said gas at a controlled pressure to the gas port;

supplying a liquid at a higher pressure than the gas to the input port for liquid from a supply of such liquid via a first valve having a first valve inlet port communicating with the supply of liquid and a first valve outlet port communicating with the inlet port for liquid; and dispensing liquid with said gas dissolved therein from the output port for liquid via a dispense tap to ambient, the dispensing liquid step including a start dispense step in which dispensing commences and a stop dispense step in which dispensing is stopped, the first valve being opened with said dispensing tap in said start dispense step, and being closed in said stop dispense step; and relieving pressure build-up in liquid in communication with the said space after closure of the first valve and while maintaining the first valve closed.

Preferred embodiments of the method include one or more of the following features: The said pressure build-up is relieved by withdrawing at least a predetermined volume of liquid from an otherwise closed volume of liquid in communication with the said space; and the predetermined volume may comprises a characteristic volume corresponding to the expansion of liquid that would otherwise occur in said space absent said withdrawing step due to continuing dissolving of the gas in liquid in said space after stopping dispense. Alternatively, the said pressure build-up is relieved by allowing a closed volume of liquid in communication with the said space to expand by at least a characteristic volume. In either such case, the characteristic volume may be determined by the formula (1) above.

Embodiments of the method that involve withdrawing at least a predetermined volume of liquid from said liquid in communication with the said space may include one or more of the following features: The withdrawing step is performed by closing the dispense tap at least a pre-determined interval corresponding to said predetermined volume after closure of the first valve. A second valve, having a second valve input port and a second valve output port, is coupled to receive liquid from said space at said second valve input port, and is opened in the interval from and including one of opening of the first valve and closure of the first valve and closed a pre-determined interval corresponding to said predetermined volume after closure of the first valve to pass liquid from said second valve output port to a position permanently at a pressure below that of said space. The start dispense step comprises opening the first and second valves and the dispense tap at the same time. The second valve is opened when the first valve closes. The second valve outlet port communicates with the outlet of the dispense tap. The step of supplying a liquid at a higher pressure than the gas comprises delivering liquid from a supply thereof at a pressure lower than said higher pressure by a pump having a suction side and a delivery side, the suction side being coupled to said supply and the delivery side being coupled to the inlet port for liquid; and wherein the second valve outlet port communicates with one of said suction side and said supply.

Embodiments of the method that involve allowing a closed volume of liquid in communication with the said space to expand by a characteristic volume may include one or more of the following features:

In a preferred arrangement, the liquid comprises a beverage supplied substantially at pressure in a bag-in-box container, the step of supplying a liquid at a higher pressure than the gas comprising delivering liquid from the said container by a pump having a suction side and a delivery side, the suction side being coupled to said container and the delivery side being coupled to the inlet port for liquid.

In a second and alternative aspect of this disclosure, the present invention apparatus for adding a gas comprising carbon dioxide or nitrous oxide to a liquid during dispense thereof from a supply of said liquid comprises:

a membrane contactor having a contactor housing with a plurality of gas-permeable hollow fibres mounted therein, the contactor housing having a gas port communicating with the interior of the fibres and adapted to receive said gas at a controlled pressure thereat, and input and output ports for liquid communicating with space within the contactor housing surrounding the fibres;

a first valve having a first valve inlet port arranged for communication with the supply of liquid and a first valve outlet port communicating with the inlet port for liquid and arranged for supply of said liquid to the inlet port for liquid at a higher pressure than said controlled gas pressure;

a dispense tap coupled to the output port for liquid and adapted to dispense liquid to ambient:

and a control system coupled to monitor opening and closing of the first valve and the dispense tap, whereby to the control a start dispense step in which dispensing commences and a stop dispense step in which dispensing is stopped, the control system being arranged to open the first valve with said dispensing tap in said start dispense step, and being arranged to close said first valve in said stop dispense step, and to relieve pressure build-up in liquid in communication with the said space after closure of the first valve and while maintaining the first valve closed.

In preferred embodiments of the apparatus, the control system is arranged to cause at least a predetermined volume of liquid, preferably a characteristic volume defined by formula (1), to be withdrawn from an otherwise closed volume of liquid in communication with the said space. In other preferred embodiments of the apparatus, the control system is arranged to allow a closed volume of liquid in communication with the said space to expand by at least a characteristic volume, preferably a characteristic volume defined by formula (1). The control system may include a diaphragm chamber one side of which is coupled to liquid in communication with the said space and the other side of which is coupled in said stop dispense step to gas at the gas port.

Those skilled in this field will readily appreciate that the above teachings enable use of hollow membrane contactors in a carbonation dispense, while substantially avoiding the drawbacks arising from the inherent pressure characteristics of liquid pumps and the consequences of the additional liquid expansion effect. By this means, substantial protection is provided against flooding of fibres at times when there is no requirement for liquid to flow. During the short time when liquid is being dispensed, a liquid pressure which is higher than the applied gas pressure is employed. This has no long-term effect on the membranes and avoids exposing carbonated liquid to super-saturated conditions in the tubing between the contactor and the dispense tap. This is advantageous when dispensing liquids which have high carbonation levels and which tend to foam.

Moreover, no part of the liquid circuit contains stagnant liquid when the dispense tap is opened, therefore enabling cleaning of the dispense system according to standard practices without requiring removal of components.

BRIEF DESCRIPTION OF THE DRAWINGS

Reference may now be made to the description below in connection with the accompanying drawings which disclose a number of embodiments utilising the teachings of this disclosure, in which.

DESCRIPTION OF THE PREFERRED EMBODIMENTS

In the description hereinbelow, the term gas is used to denote either carbon dioxide gas in a carbonation system or nitrous oxide in a nitrous oxide foaming system.

Figure 1:
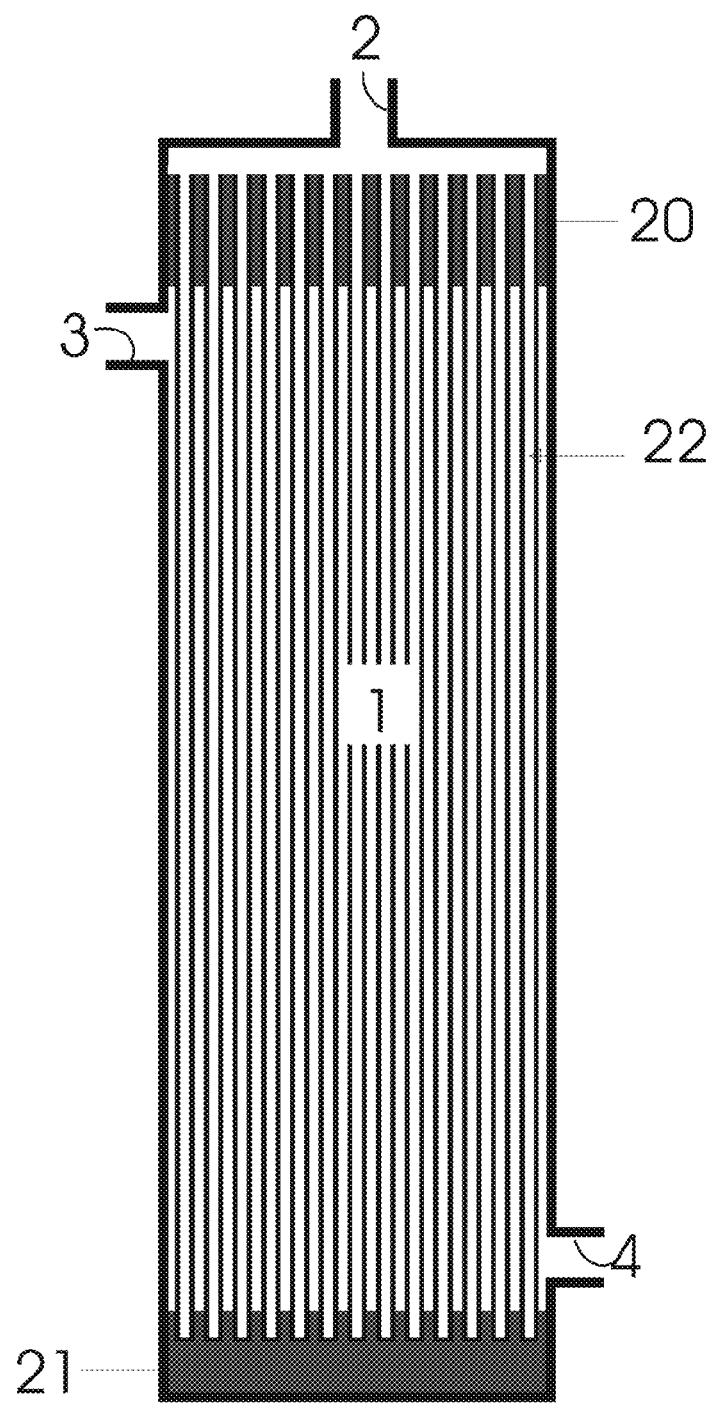
FIG. 1 is a somewhat schematic sectional view of a membrane contactor.

Referring first to FIG. 1, there is shown in a schematic manner the typical construction of a gas/liquid contactor 1 of the kind described in more detail in U.S. Pat. No. 5,565,149. The contactor's gas port 2 communicates with the bore volumes of a plurality of gas-permeable hollow fibres 22 whose open ends penetrate through seal 20 separating the shell side volume of 1 from its port 2. The ends of the fibres remote from 2 are closed within seal 21. The liquid inlet port of contactor 1 is labelled 3 and its liquid outlet port is labelled 4. Ports 3 and 4 communicate with the shell-side volume which contains liquid.

Figure 2:
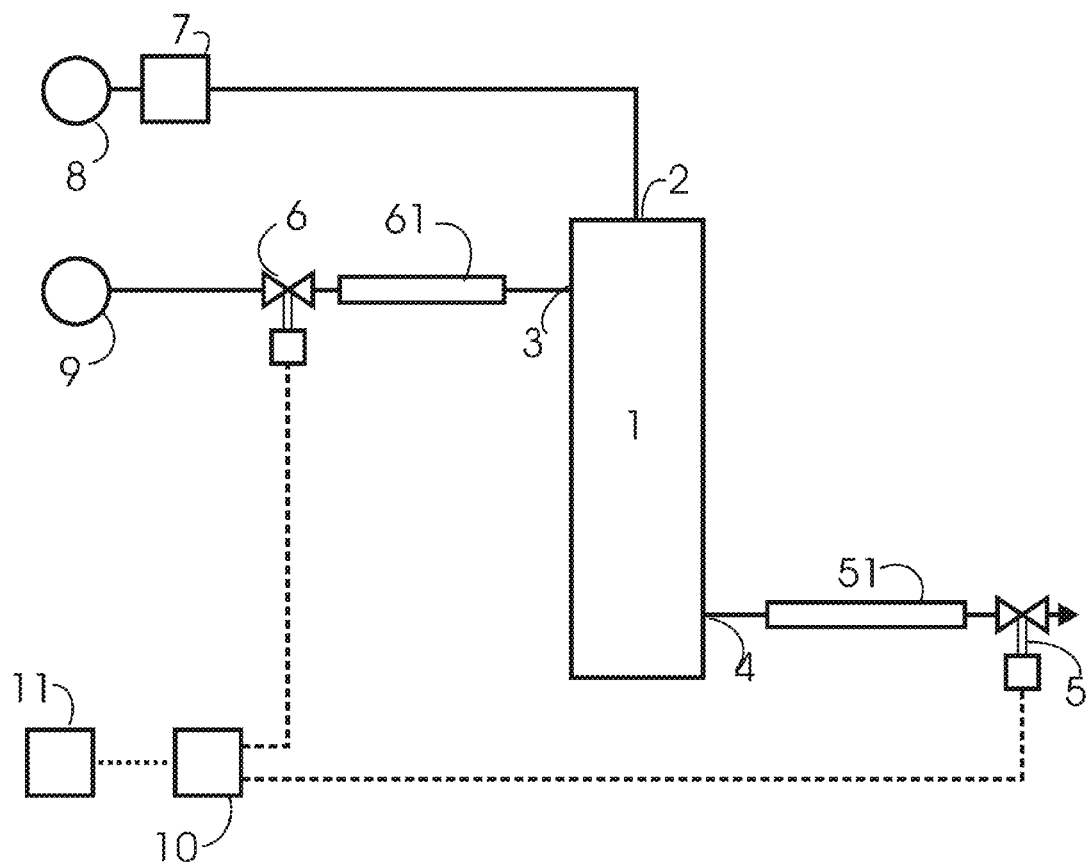
FIG. 2 is a schematic circuit diagram for a dispense system employing a contactor as shown in FIG. 1.

FIG. 2 shows how the contactor 1 of FIG. 1 may be connected in a system in which dispense of liquid is effected by manual operation of an electric push-button. In use, contactor 1 is suitably arranged approximately vertical with its liquid outlet port 4 lowermost.

Gas from a gas source 8 is supplied to port 2 via a pressure regulator 7. Liquid inlet port 3 communicates with a pressurised liquid source 9 through a cooling coil 61. Liquid outlet port 4 communicates via a cooled flow restriction element 51 with a dispense valve 5. The pressure of the liquid supplied during dispense liquid flow from source 9 is arranged to be higher than the gas pressure applied to port 2. Valve 5 and a second valve 6 intermediate liquid source 9 and cooling coil 61 are opened and closed by the action of a remote actuator 11 and a control unit 10 in the manner explained below.

Restriction 51 is normally included to achieve conditions in the liquid when flowing between port 4 and valve 5 which inhibit formation of gas bubbles prior to 5 when dispensing the liquid.

Pressurised liquid source 9 is associated with a pump arranged to stop automatically when valve 6 closes. The stalled liquid pressure from the pump will be significantly higher than its flow pressure, when liquid is being dispensed from the system.

To dispense liquid from valve 5, dispense actuator 11 is operated and control unit 10 causes substantially simultaneous opening of both valves 5 and 6. Liquid from source 9 then flows through contactor 1, first displacing liquid hitherto held within contactor 1 and enabling additional gas, at the pressure regulated by regulator 7, to permeate from the bore side of the hollow fibres in contactor 1 through to their shell side where it dissolves into the incoming liquid.

When a sufficient volume of liquid has been dispensed, actuator 11 is released. Control unit 10 then closes valve 6 immediately and closes valve 5 after a pre-determined delay. The duration of the delay between closing of valve 6 and closing of valve 5 is chosen so that the amount of liquid dispensed in this interval is approximately the same as the amount of liquid expansion calculated according to Formula (1). For example, for a system carbonating water to 10 grams per liter and dispensing at 0.045 liters per second, this interval would typically be set to 0.05 seconds.

This sequence of control actions determines the behaviour of the liquid pressure in the shell side of contactor 1 in a manner which will now be explained by reference to FIG. 3.

Figure 3:
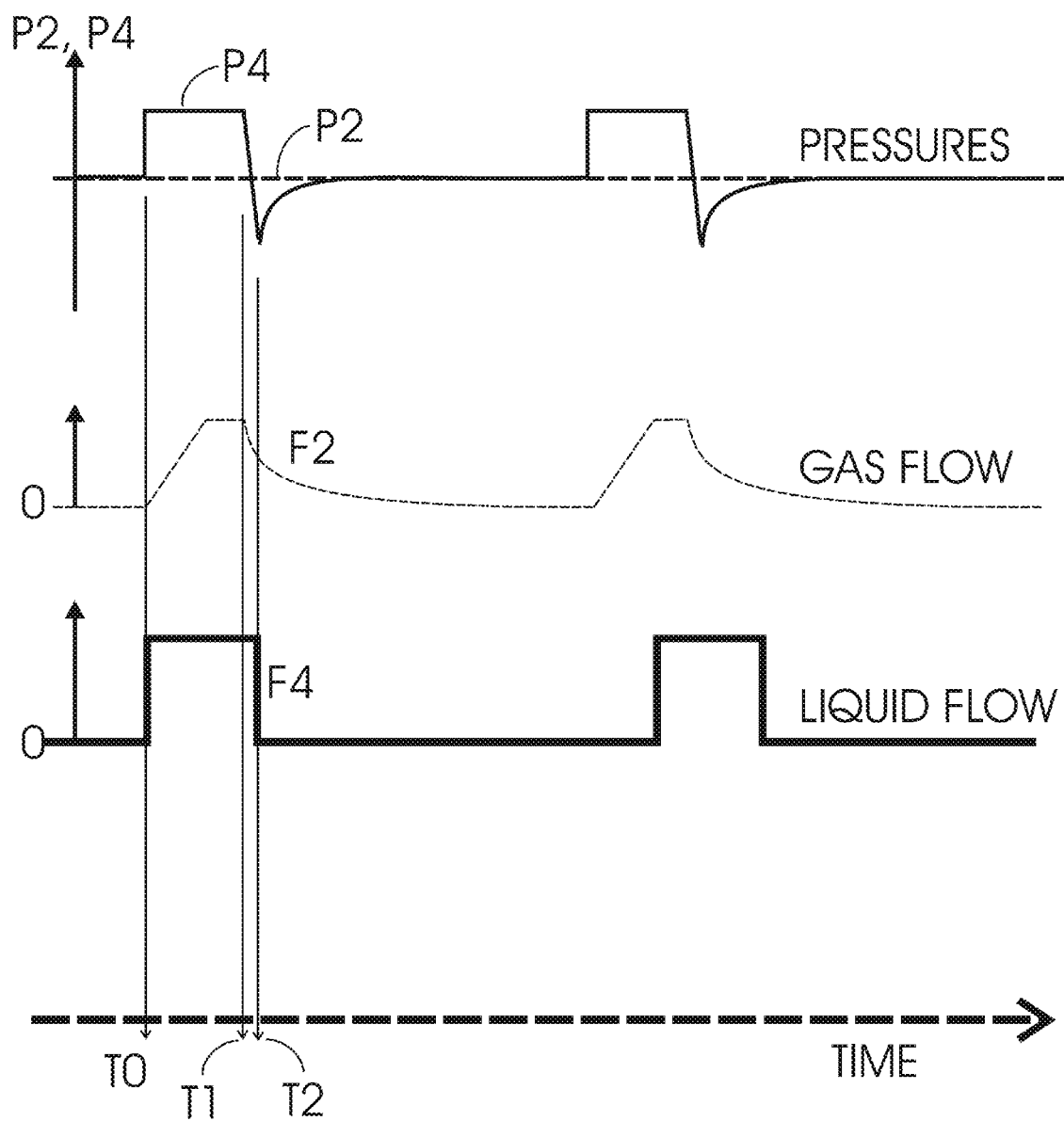
FIG. 3 is a graph illustrating, in successive lines, gas pressure within the membrane fibres and liquid pressure surrounding the fibres, gas flow and liquid dispense flow, in each case with respect to time, for the embodiment of FIG. 2.

FIG. 3 illustrates for this first embodiment and in a schematic manner without implying scale, the time-response of gas pressure within the fibres, P2, and liquid pressure outside the fibres, P4, through a sequence which includes a period during which liquid flows during dispense and also a period when liquid is not flowing. FIG. 3 also illustrates the corresponding time-response through the same sequence of gas flow rate through port 2, F2, and liquid flow rate through port 4, F4.

Dispense liquid flow F4 into the contactor is started at time T0 when both valves 5 and 6 are opened simultaneously, and is stopped at time T1 when valve 6 closes.

The gas pressure applied to the fibres 1 is maintained at P2 at all times. This pressure determines the maximum amount of gas which can be dissolved in the liquid. As will be explained below, the pressures P2 and P4 are equal prior to the start of each dispense. At such time the liquid contained within 1 will therefore usually be saturated with the dissolved gas.

In the interval from T0 to T1, the pressure P4 of liquid delivered by source 9 and applied to contactor 1 is advantageously arranged to be greater than P2 so that during each dispense the previously saturated liquid in 1 is subject to sub-saturation condition as it flows out through port 4. This eliminates the possibility of gas bubbles forming within contactor 1 and, together with the action of restrictor 51, reduces the tendency of bubbles forming between port 4 and the dispense outlet valve 5.

As previously explained, prior to the start of each dispense all liquid contained within contactor 1 will already be saturated by dissolved gas. Flow of gas, as shown by F2, into port 2 will only start again at T0, its rate of flow reaching a maximum value when all the saturated liquid which was previously held in contactor 1 has been displaced out through port 4.

During dispense, when liquid flows through contactor 1, dissolved gas concentration in the liquid increases as it moves from inlet 3 to outlet 4. For given process conditions, the dissolved concentration at outlet 4 will be determined by the internal structure of contactor 1 and the time taken for liquid to pass through it. Well-designed contactors will in practice achieve at least 90% saturation level calculated for the process temperature and applied pressure P2 of gas.

Valve 6 closes at time T1 and valve 5 closes at time T2 which is a pre-set interval after T1. After T1 liquid source 9 is no longer in communication with the contactor 1, so that liquid pressure P4 rapidly decays to below P2 at time T1.

After initially reducing, the liquid pressure then increases after T2 until all liquid within contactor 1 is saturated with dissolved gas, according to the effect we have earlier discovered whereby carbonation of liquid mixes causes a small expansion.

If the optimum interval T2-T1 is used, the volume of liquid released in this interval is equal to the characteristic expansion volume for the contactor, and the final liquid pressure which develops in contactor 1 after time T2 will be equal to the constant gas pressure applied to contactor 1. For a system with an efficient contactor containing 200 ml of liquid, carbonating to 10 grams per liter and dispensing at a flow rate of 11 ml/second, the optimum interval is 0.07 seconds. For the same carbonation level and contactor efficiency, the optimum interval T2-T1 will be proportional to the liquid capacity of the contactor and inversely proportional to the dispense flow rate.

The interval T2-T1, determined by control unit 10, does not, however, need to be set accurately provided that it set no lower than the optimum value.

If interval T2-T1 is less than optimum, the final liquid pressure after T2 will be higher than the gas pressure and this condition will not protect the fibres in contactor 1 from flooding during the long and repeated standby periods following each dispense.

If the set interval T2-T1 is greater than the optimum, the final liquid pressure will not fall below the applied gas pressure because of gas permeation through fibres into the liquid side of contactor 1. The pressures on the liquid side and the gas side of the fibres will thus rapidly equalise.

Even if interval T2-T1 is much longer than optimum, gas permeation will continue for a longer time after T2, forming a gas void in the liquid side of contactor 1.

During the next dispense, when fresh un-carbonated liquid flows into the vertical contactor 1 at the higher pressure P4, the gas in such void is completely dissolved and the outlet liquid from the contactor remains bubble-free during dispense.

The control action described above advantageously allows contactor 1 to be operated with liquid pressure P4 higher than gas pressure P2 only during dispense events. The duration of each such event is typically of the order of 10 to 30 seconds. It has previously been established that an excess liquid pressure of 0.05 MPa can safely be used for such brief times in contactors as described in U.S. Pat. No. 5,565,149.

At all other times the pressures of liquid and gas within the contactor are held equal. The advantages are that the contactor's fibres will not become flooded in operation, and also that the dispensed liquid will retain higher carbonation since less gas bubbles can form between port 4 and valve 5.

The schematic arrangement illustrated in FIG. 2 is but one arrangement for achieving the required delay between closure of inlet valve 6 and outlet valve 5. These valves may in practice be actuated by electric, pneumatic or hydraulic means.

Figure 4:
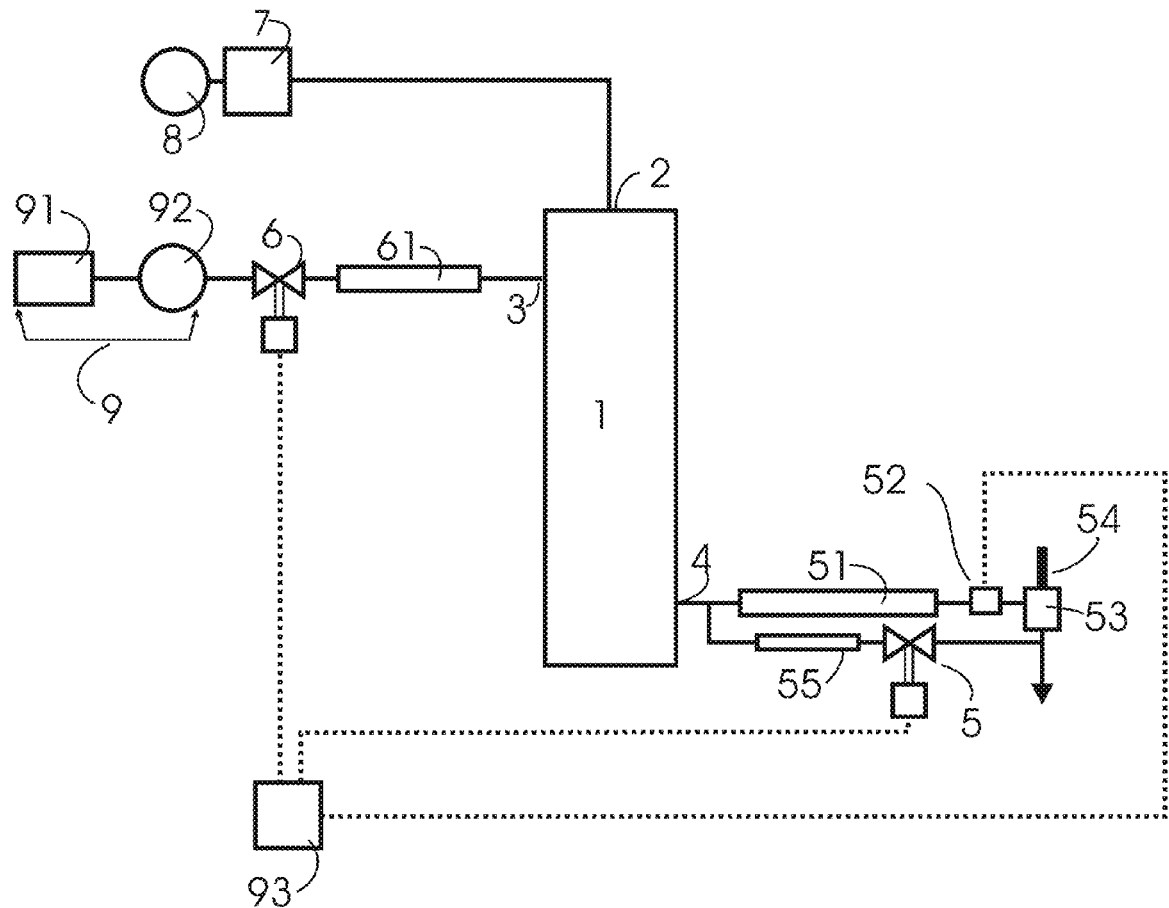
FIG. 4 shows an alternative embodiment of dispense system employing the contactor of FIG. 1 in a view similar to FIG. 2.

An alternative embodiment is illustrated schematically in FIG. 4, in which the same reference numerals are used for like parts in the embodiment of FIG. 2. In this embodiment a dispense tap 53 is opened using a manual actuator 54. The pressurised liquid source 9 comprises a pump 92 coupled to a supply 91 of the liquid. Pump 92 is selected so that when valves 6 and 53 are open it operates and delivers the required rate of flow of liquid through contactor 1. During such flow, the liquid pressure at port 3 is advantageously arranged to be higher than the pressure of carbon dioxide applied to port 2 of the contactor.

When valve 6 closes, pump 92 stops automatically and the liquid pressure at the contactor will be higher than when liquid is being dispensed from the system.

A pressure switch 52 is hydraulically coupled between flow restriction 51 and manually operated dispense tap 53, and communicates electrically with a control unit 93. Switch 52 is adjusted so that when tap 53 is open the switch 52 is in its low pressure electrical state, and when valve 53 is closed the switch 52 is in its high pressure electrical state.

When valve 53 is opened to commence dispense, the electrical state of switch 52 changes to its low pressure condition and the action of control unit 93 immediately opens valve 6 and optionally also opens valve 5. In this arrangement, liquid will flows both through tap 53 and also through valve 5 bypassing tap 53. However, a flow restrictor 55 connected between port 4 and valve 5 reduces flow through valve 5 so that it is very small compared to the flow through tap 53. Pump 92 automatically starts and maintains flow of liquid into port 3 of contactor 1 at a pressure which is greater than the pressure of gas applied to port 2.

When tap 53 is closed, the pressure of liquid at switch 52 increases and causes the electrical state of switch 52 to change. The action of control unit 93 is then to close valve 6 at the same instant and to keep open valve 5 for a further pre-determined time sufficient to allow release of the characteristic liquid expansion volume for the contactor.

In a second version of this arrangement, the system is designed so that valve 5 is not opened simultaneously with valve 6, but instead is opened after valve 6 is closed, the duration for which valve 5 is opened being determined by control unit 93 so that the characteristic liquid expansion volume for the contactor is released from the liquid circuit of the system downstream of tap 53 without causing pump 92 to re-start. As a result, when valve 5 closes, the pressure of liquid within the contactor 1 has been reduced by a fixed amount such that upon completion of the subsequent expansion effect, as already described, the liquid and gas pressures within contactor 1 will be equalised In FIG. 4, the point of connection of valve 5 with liquid on the liquid side of the membranes of contactor 1 is shown at the outlet port 4, but it will be apparent that its connection point with liquid on the liquid side of the contactor may be anywhere between the outlet of valve 6 and the inlet of restrictor 51.

Figure 5:
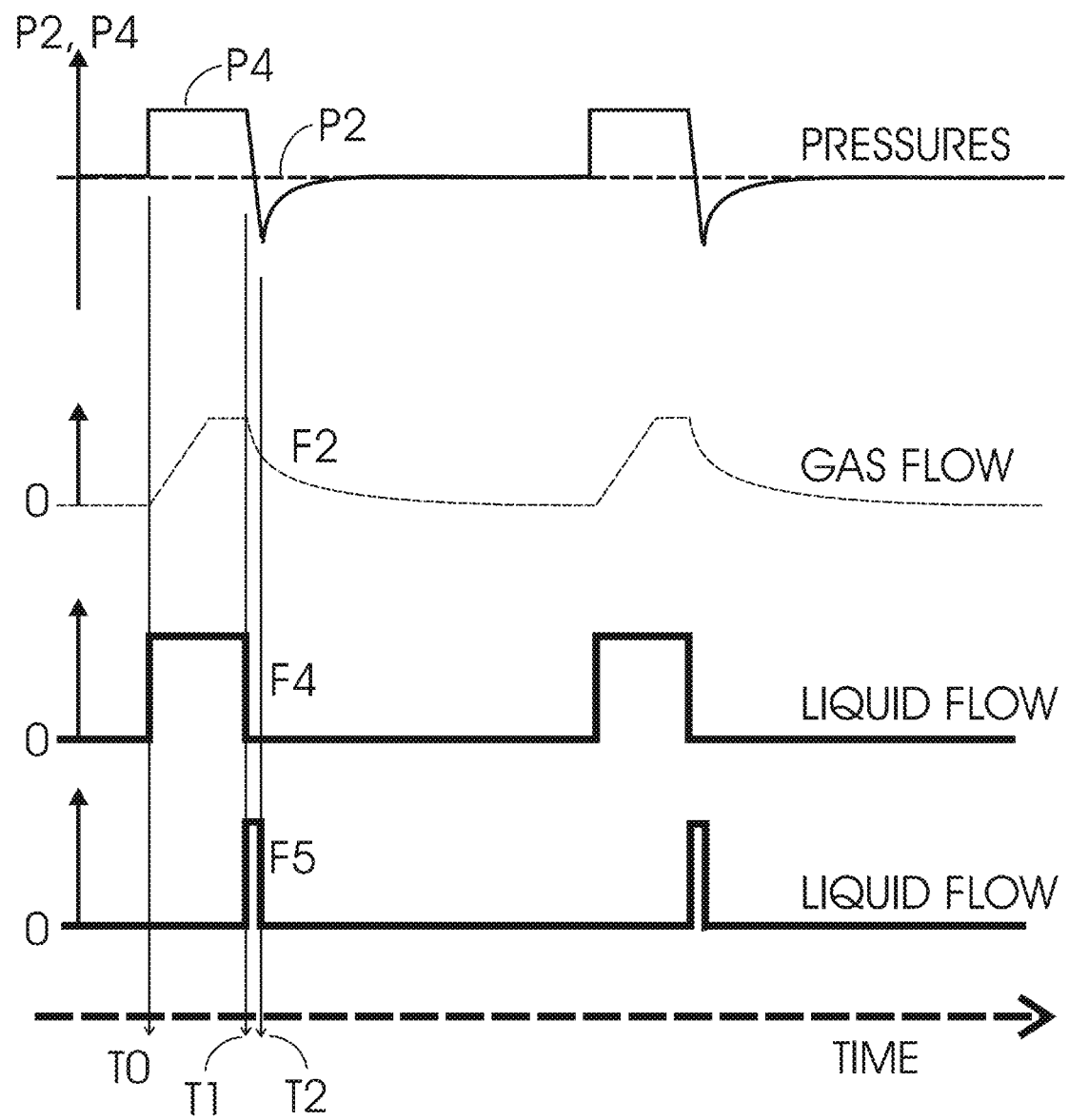
FIG. 5 is a graph similar to FIG. 3 for the embodiment of FIG. 4, illustrating in an additional line liquid flow through a relief valve.

FIG. 5 illustrates, for the second version of the embodiment shown in FIG. 4, and in a schematic manner without implying scale, the time-response of the gas pressure P2 within the fibres, and of the liquid pressure P4 surrounding the contactor's fibres, through a sequence which includes the period from T0 to T1 while liquid flows through port 4 of the contactor during dispense, the period from T1 to T2 while the small extra volume of liquid is withdrawn by valve 5, and from T2 until the next dispense while liquid is not flowing. The Figure also illustrates the corresponding time-response through the same sequence of the gas flow rate F2 through port 2, the liquid flow rate F4 through port 4, and the liquid flow F5 through valve 5.

Figure 6:
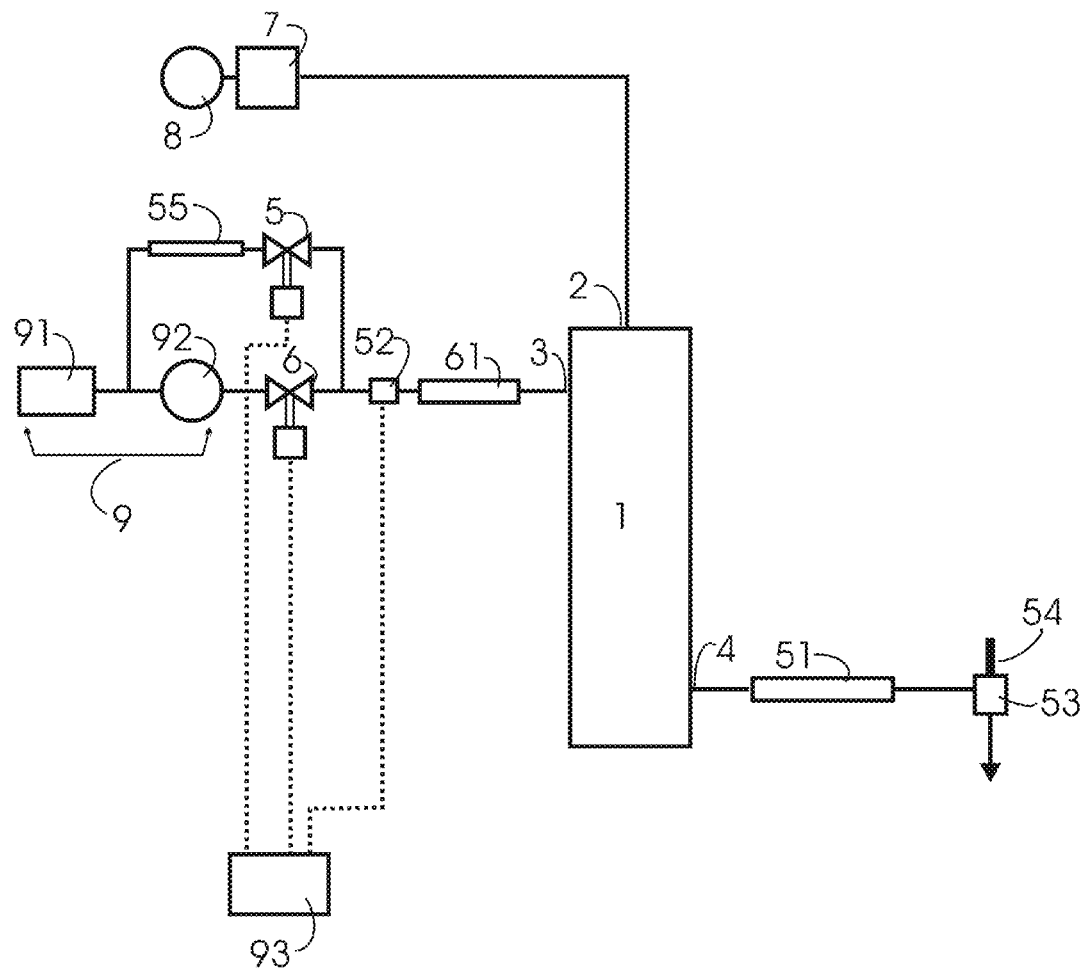
FIG. 6 shows a second alternative embodiment of dispense system employing the contactor of FIG. 1 in a view similar to FIG. 2.

FIG. 6 shows a third embodiment, wherein the same reference numerals are employed as for like parts in the embodiment of FIG. 4. In this embodiment, the functions and means of operation and control of all the parts and components are the same as described above for the second embodiment, except that valve 5 and flow restrictor 55 are now positioned so that the characteristic liquid expansion volume for the contactor is released into the suction side of pump 92 after closure of valve 6. It is to be noted that, in this embodiment, the characteristic liquid expansion volume released after closure of valve 6 is liquid that does not contain the added gas, so that the connection point to valve 5 should be upstream of the contactor 1.

The resulting changes of pressures in response to dispense flow and to operation of valves 5 and 6 through switch 52 and control unit 93 are the same as previously described for the second version of the second embodiment, and illustrated in FIG. 5.

It will be appreciated that the arrangement illustrated in FIG. 4 requires a manual dispense tap 53 modified to accept flow via valve 5 to its outlet, and that this arrangement results in a small volume being over-dispensed or being wasted. The third embodiment is thus to be preferred in circumstances where the dispense tap 53 is not modified, and in circumstances where it would be undesirable to allow wastage of the small amount of liquid released by valve 5 after closure of valve 6.

Turning now to the embodiments of FIGS. 7 to 10, for clarity and because the details are not relevant to the present disclosure, details of features and components relating to temperature control of the liquid have been omitted from the circuit diagrams.

Gas port 2 of contactor 1 is connected to a gas source 101 via a pressure regulator 102 which is of the type generally known as a relieving regulator, which signifies that it will if necessary vent excess gas from its output side to maintain its control pressure. Liquid inlet port 3 is connected to a liquid source 103 via solenoid-operated valve 104 and a pressure regulator 105. Liquid outlet port 4 is connected to a solenoid valve 106 which here acts as the tap for dispensing the liquid.

The pressure of gas source 101 is arranged to be greater than the outlet pressure of regulator 105. The outlet pressure of regulator 105 is advantageously arranged to be at least 0.03 MPa greater than the outlet pressure of regulator 102, but for the type of fibre described in U.S. Pat. Nos. 5,565,149 and 7,104,531 it may be up to 0.1 MPa greater.

Solenoid valves 104 and 106 are of the type generally described as 2/2 valves, and they are normally closed. When energised they are caused to open to allow flow through them.

Figure 7:
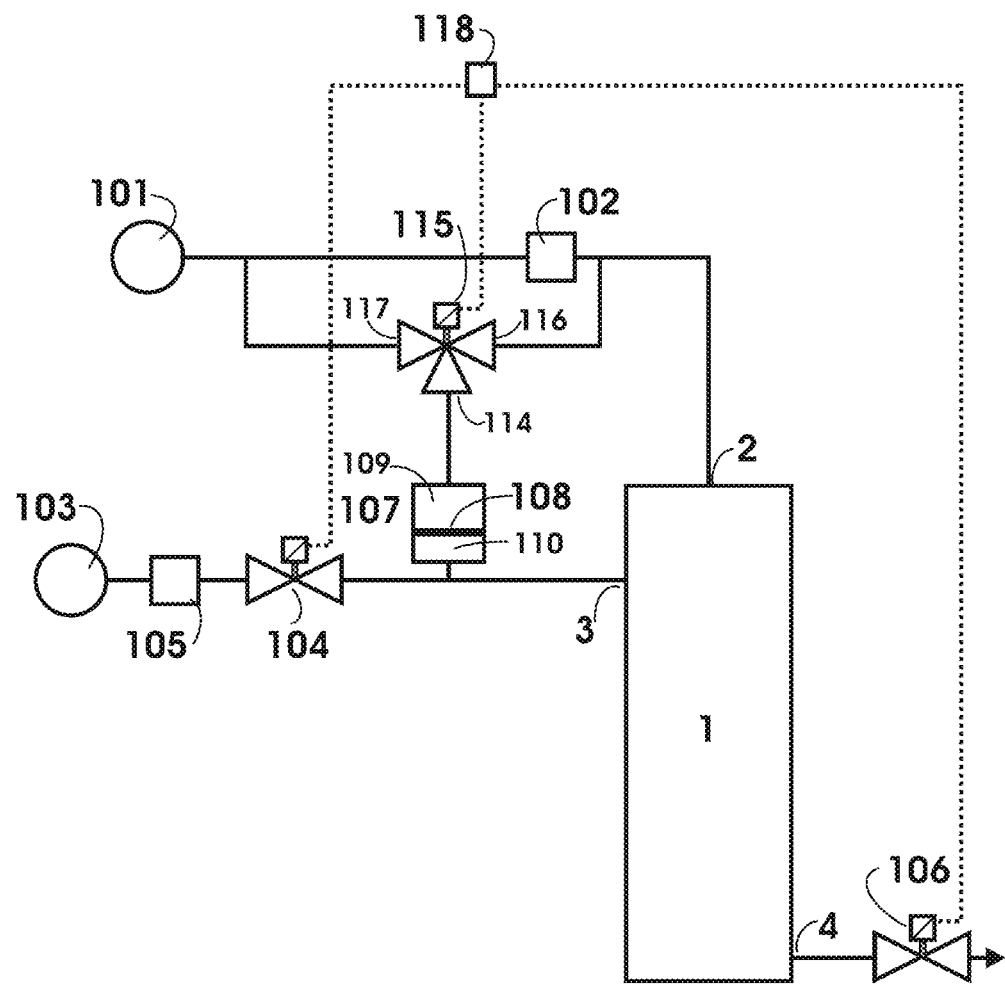
FIG. 7 is a schematic circuit diagram for a further embodiment of dispense system employing a contactor as shown in FIG. 1.

A pressure equalising diaphragm chamber 107 is connected as shown between the liquid and gas supplies to contactor 1 as shown in FIG. 7 and described below with reference to FIG. 8.

Figure 8:
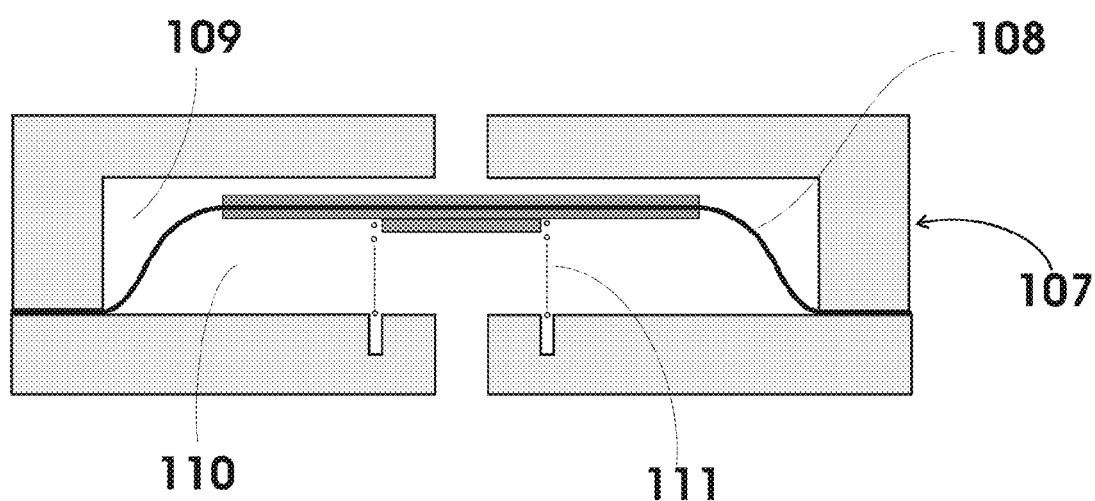
FIG. 8 is a schematic sectional view through a diaphragm chamber.

FIG. 8 shows in a schematic cross-sectional view a pressure equalising chamber 107 in which a flexible diaphragm member 108 acts as a barrier between a first compartment 109 and a second compartment 110 within chamber 107. FIG. 8 shows the flexible diaphragm member 108 in the position when the volume of second compartment 110 is at its maximum and when the pressures in compartments 109 and 110 are substantially equal. Chamber 107 is constructed so that movement of flexible diaphragm member 108 will change the volume of second compartment 110 by at least the aforesaid characteristic volume defined by formula (1). A spring 111 is optionally included in second compartment 110 to aid movement of flexible diaphragm member 108. Chamber 107 is provided with respective ports 112 and 113 connecting into its two compartments.

As shown in FIG. 7, compartment 109 communicates via its port 112 with port 114 of a solenoid-operated 3-port valve 115. Compartment 110 communicates its port 113 with liquid inlet port 3 of contactor 1.

A second port 116 of valve 115 communicates with gas inlet port 2 of contactor 1, and third port 117 of valve 115 communicates with the high-pressure side, namely the inlet port side, of pressure regulator 102.

Valve 115 is of the type generally known as a 3/2 valve. Port 114 is the common port which communicates internally only with port 116 when valve 115 is not energised. When valve 115 is energised, port 114 is caused to communicate internally only with port 117.

When valves 104, 106 and 115 are not energised, the pressure applied at port 2 is equal to the pressure in compartment 109 chamber 107. In this condition the action of flexible diaphragm member 108 ensures that contactor 1 experiences equal pressures both on the gas inside its hollow fibres and on the liquid outside its hollow fibres.

When it is required to dispense carbonated liquid, a control switch 118 is activated manually, causing valves 104, 106 and 115 to be energised. Port 3 and compartment 110 now communicate with the outlet of pressure regulator 105, allowing liquid to start flowing into contactor 1 and out of valve 106. At the same time Port 114 of valve 115 admits gas from source 101 into compartment 109, and flexible member 108 moves to increase the volume of compartment 109 while reducing the volume of compartment 110.

During dispense, regulator 105 therefore maintains the pressure of liquid within the contactor 1 and in the tubing between port 4 and valve 106 at a pressure above the gas pressure applied to port 2. This condition, together with cooling means (not shown) has the advantage that, until exiting valve 106, the liquid can be kept below saturation with respect to the dissolved carbon dioxide.

When the required volume of carbonated liquid has been dispensed, switch 118 is de-activated manually. At this instant, valves 104 and 106 close, isolating the liquid volume between them. At the same instant, valve 115 allows port 114 to communicate internally to port 116. Since pressure regulator 102 is a relieving regulator, the gas pressure in compartment 109 decays to the outlet pressure setting of regulator 102.

The flexible diaphragm member 108 acts to maintain equal pressures in compartments 109 and 110, therefore enabling the previously discussed expansion of liquid following dispense to be completed at constant pressure which, furthermore, is equal to the gas pressure applied to the contactor 1.

During the standby periods between dispense, the pressures of both liquid and gas within contactor are thus maintained in balance and there is no risk of flooding of the fibres.

Figure 9:
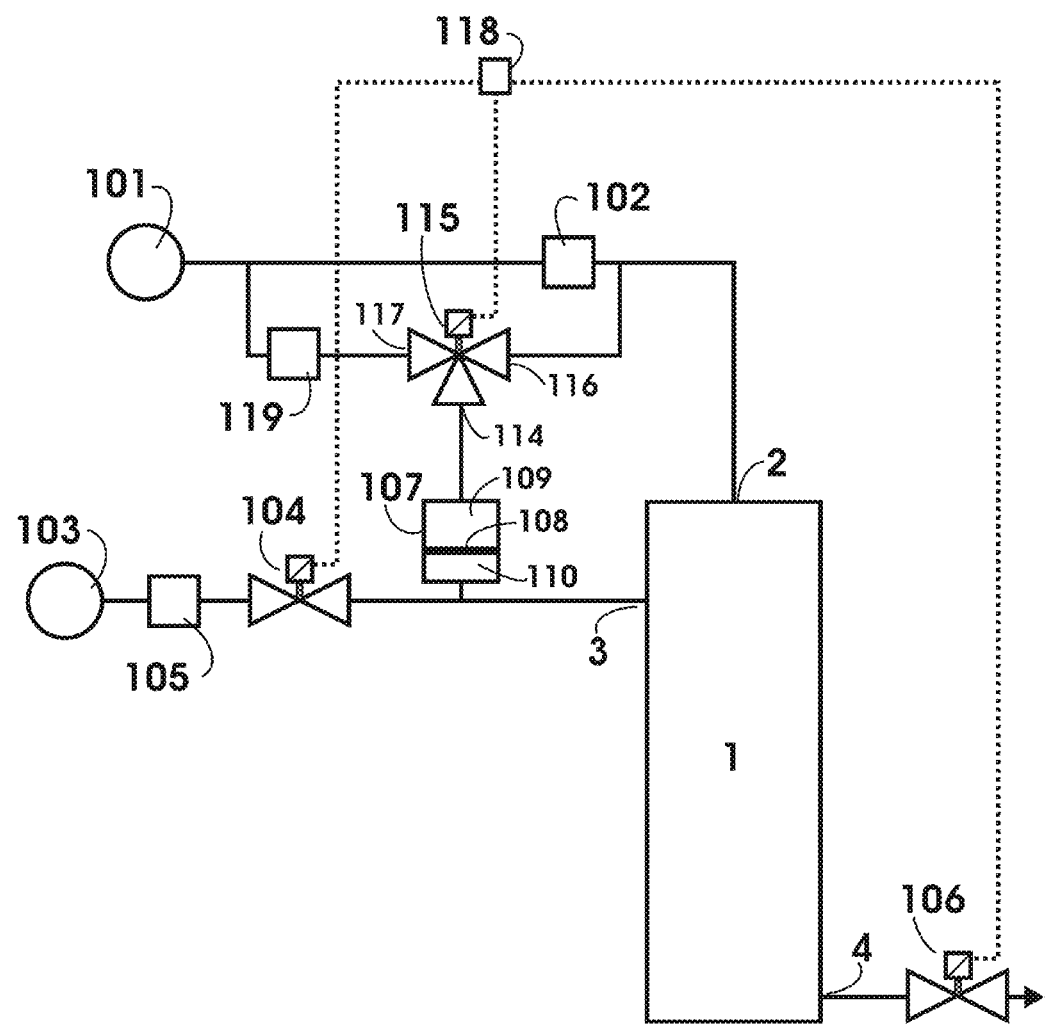
FIG. 9 shows an alternative embodiment of dispense system employing the contactor of FIG. 1 in a view similar to FIG. 7.

FIG. 9 shows a variation of the embodiment of FIG. 7. Like parts and components are identified by the same reference numerals in the two Figures. In this embodiment, which is preferred when the pressure of the source 101 is relatively high, a further gas regulator 119 is used to set the pressure applied to port 117 of valve 115. The operation and function of all other parts are the same as described with reference to FIG. 8.

Figure 10:
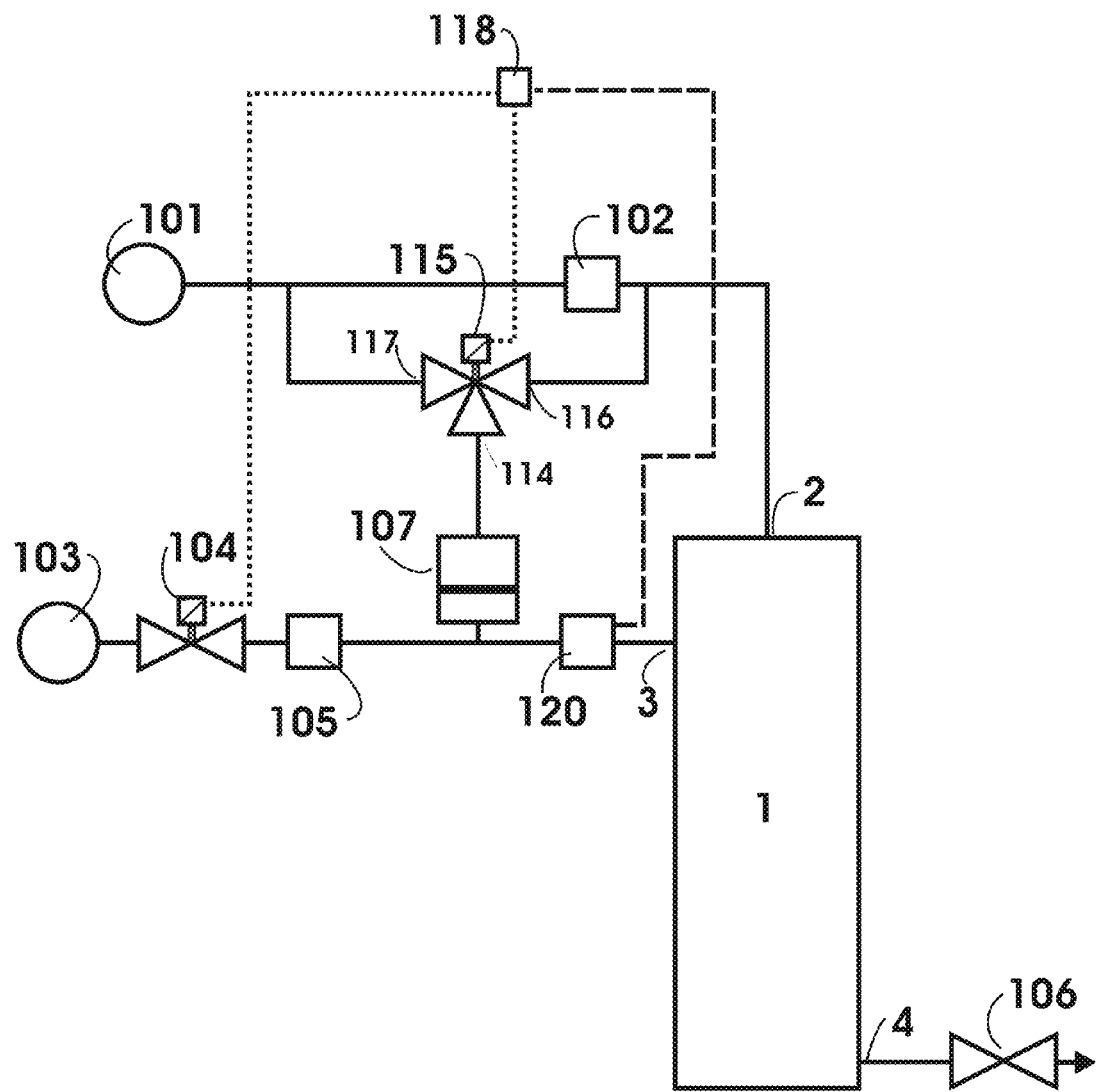
FIG. 10 shows a second alternative embodiment of dispense system employing the contactor of FIG. 1 in a view similar to FIG. 7.

FIG. 10 shows a further variation in which like parts and components are identified by the same reference numerals as in FIGS. 8 and 10. In this embodiment, the dispense valve 106 is opened and closed manually, and is not coupled to the control system. Instead, a flow-detection unit 120 is connected at some point between the outlet of valve 104 and the inlet of valve 106 to detect when liquid is flowing in the system. In the illustrated arrangement, detector 120 is connected between regulator 105, here on the outlet side of valve 104, and port 3. Alternatively, detector 120 could be fitted between port 4 and dispense valve 106.

The detector 120 provides an electrical input to control switch 118 at the instant that dispense valve 106 is opened, maintains that electrical input while valve 106 remains open, and removes that input when valve 106 is closed at the end of dispense. In FIG. 10 the line connecting detector 120 to control switch 118 is drawn differently to show that switch 118 responds to the electrical input from detector 120, whereas the outputs from switch 118 control the status of valves 104 and 115.

The operation and function of all other parts in this embodiment are the same as for the embodiment of FIG. 7.

It has long been the desire, particularly in the beer brewing industry, to supply beverages in an essentially unpressurised bag-in-box or polypin format for carbonation at the point of dispense. Heretofore, shortcomings in the carbonation systems employed have prevented the widespread commercial adoption of this obviously advantageous alternative to the traditional cask or keg format.

While membrane carbonators of the kind disclosed in U.S. Pat. No. 5,565,149 were known to be reliable and to be capable of providing the desired carbonation, unlike some rival arrangements that rely upon direct injection of gaseous carbon dioxide into unpressurised or previously degassed beer and passage of both beer and gas together through a bulk granulate quartz material with a large contact surface area, a tendency for degradation of the membrane carbonator over time by flooding with liquid in the intervals between individual dispenses, has previously prevented widespread commercialisation. The present disclosure shows how this drawback of membrane carbonators may be substantially overcome. Balancing gas pressure and liquid pressure during the systems' standby periods along the lines described herein can substantially protect the membranes from flooding.

A primary application for embodiments of systems in accordance with the present teachings is incorporation into a bag-in-box beverage dispensing system. It will readily be appreciated that a membrane carbonator together with the associated controls may be incorporated into each bag-in-box unit, or may be supplied at the point of dispense for coupling to a refill bag-in-box beverage supply.

It will also be appreciated that the teachings of this disclosure may be applied to diverse beverages including beer, soda water, and wine. In the case of wine, embodiments of system in accordance with the present teachings may be employed to provide at the point of dispense from a still wine, a passable substitute for a sparkling wine, as for example glasses of a passable substitute for a blanc de blanc from bulk still Chardonnay wine.

By using nitrous oxide in place of carbon dioxide, dairy- or dairy substitute-based products foamed at the point of dispense may be produced using embodiments of systems in accordance with the teachings of this disclosure. The characteristic liquid expansion volume calculated using Formula (1) will employ the saturation level of nitrous oxide in place of that of carbon dioxide in this case.

The invention claimed is:

1. Apparatus for adding a gas comprising carbon dioxide or nitrous oxide to a liquid during dispense thereof from a supply of said liquid; the apparatus comprising:
   a membrane contactor having a contactor housing with a plurality of gas-permeable hollow fibres mounted therein, the contactor housing having a gas port communicating with the interior of the fibres and adapted to receive said gas at a controlled pressure thereat, and input and output ports for liquid communicating with space within the contactor housing surrounding the fibres;
   a first valve having a first valve inlet port arranged for communication with the supply of liquid and a first valve outlet port communicating with the inlet port for liquid and arranged for supply of said liquid to the inlet port for liquid at a higher pressure than said controlled gas pressure;
   a dispense tap coupled to the output port for liquid and adapted to dispense liquid to ambient:

and a control system coupled to monitor opening and closing of the first valve and the dispense tap, whereby to the control a start dispense step in which dispensing commences and a stop dispense step in which dispensing is stopped, the control system being arranged to open the first valve with said dispensing tap in said start dispense step, and being arranged to close said first valve in said stop dispense step, and to relieve pressure build-up in liquid in communication with the said space after closure of the first valve and while maintaining the first valve closed.

2. Apparatus according to claim 1, wherein the control system is arranged to relieve pressure build-up in liquid in communication with the said space by causing at least a predetermined volume of liquid to be withdrawn from an otherwise closed volume of liquid in communication with the said space.

3. Apparatus according to claim 2, wherein said predetermined volume comprises a characteristic volume corresponding to the expansion of liquid that would otherwise occur in said space absent said withdrawal of said predetermined volume due to continuing dissolving of the gas in liquid in said space after stopping dispense.

4. Apparatus according to claim 3, wherein the characteristic volume is determined by the formula (1) below:

$$\Delta v = K \cdot V_c \cdot C \cdot (1 - 0.5\eta) \quad (1)$$

where
$K$=a constant specific to the particular gas, $7.2 \times 10^{-4}$ when the gas is carbon dioxide
$\Delta v$=characteristic volume, in milliliters
$V_c$=liquid volume of contactor, in milliliters
$C$=saturation level of the gas in the liquid, in grams per liter
$\eta$=efficiency of contactor at continuous flow condition.

5. Apparatus according to claim 1, wherein the control system is arranged to relieve pressure build-up in liquid in communication with the said space by allowing a closed volume of liquid in communication with the said space to expand by at least a characteristic volume.

6. Apparatus according to claim 5, wherein the characteristic volume is determined by the formula (1) below:

$$\Delta v = K \cdot V_c \cdot C \cdot (1 - 0.5\eta) \quad (1)$$

where
$K$=a constant specific to the particular gas, $7.2 \times 10^{-4}$ when the gas is carbon dioxide
$\Delta v$=characteristic volume, in milliliters
$V_c$=liquid volume of contactor, in milliliters
$C$=saturation level of the gas in the liquid, in grams per liter
$\eta$=efficiency of contactor at continuous flow condition.

7. Apparatus according to claim 1, wherein the control system is adapted to close the dispense tap at least a predetermined interval corresponding to said predetermined volume after closure of the first valve.

8. Apparatus according to claim 1, wherein the control system includes a second valve having a second valve input port and a second valve output port, and coupled to receive liquid from said space at said second valve input port, the second valve being controlled to open in the interval from and including one of opening of the first valve and closure of the first valve and being controlled to close a pre-determined interval corresponding to said predetermined volume after closure of the first valve, the second valve output port being coupled to a position arranged in use to be permanently at a pressure below that of said space.

9. Apparatus according to claim 8, wherein the control system is adapted to open the first and second valves and the dispense tap at the same time.

10. Apparatus according to claim 8, wherein the control system is adapted to open the second valve when the first valve closes.

11. Apparatus according to claim 8, wherein the second valve outlet port communicates with the outlet of the dispense tap.

12. Apparatus according to claim 8, further comprising a pump having a suction side and a delivery side, the delivery side being coupled to the first valve inlet port for delivering liquid at said higher pressure, and the suction side being arranged for communication with a supply of the liquid at a pressure lower than said higher pressure; and wherein the second valve outlet port communicates with one of said suction side and said supply.

13. Apparatus according to claim 1, wherein the liquid comprises a beverage supplied substantially at ambient pressure in a bag-in-box container, and wherein a pump having a suction side and a delivery side is coupled between the container and the first valve, the delivery side being coupled to the first valve inlet port for delivering liquid at said higher pressure, and the suction side being coupled to said container.

14. Apparatus according to claim 4, further comprising a diaphragm chamber having respective compartments on either side of a flexible diaphragm, one said compartment being permanently in communication with liquid in the said space, and the other said compartment being arranged to communicate with gas at the gas port to allow said closed volume of liquid to expand.

15. Apparatus according to claim 14, wherein the other said compartment is coupled to the common port of a three port valve; said three port valve having two further ports, one coupled to receive said gas from a source thereof, and the other coupled to said gas port, and having a first state in which said common port communicates only with said one port, and a second state in which said common port communicates only with said other port.

* * * * *